April 20, 1965  F. PRADON  3,178,849
ANIMAL TRAPPING AND DROWNING DEVICE
Filed Aug. 23, 1963
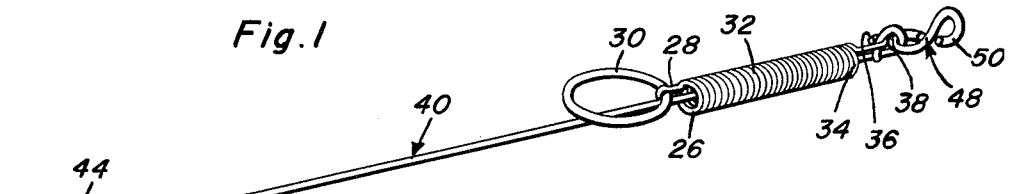
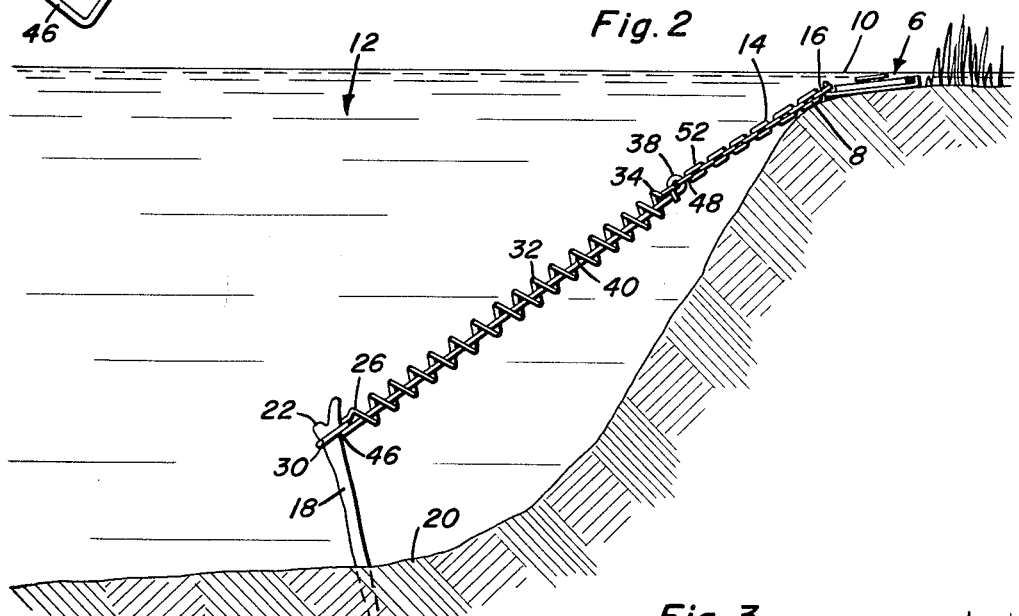
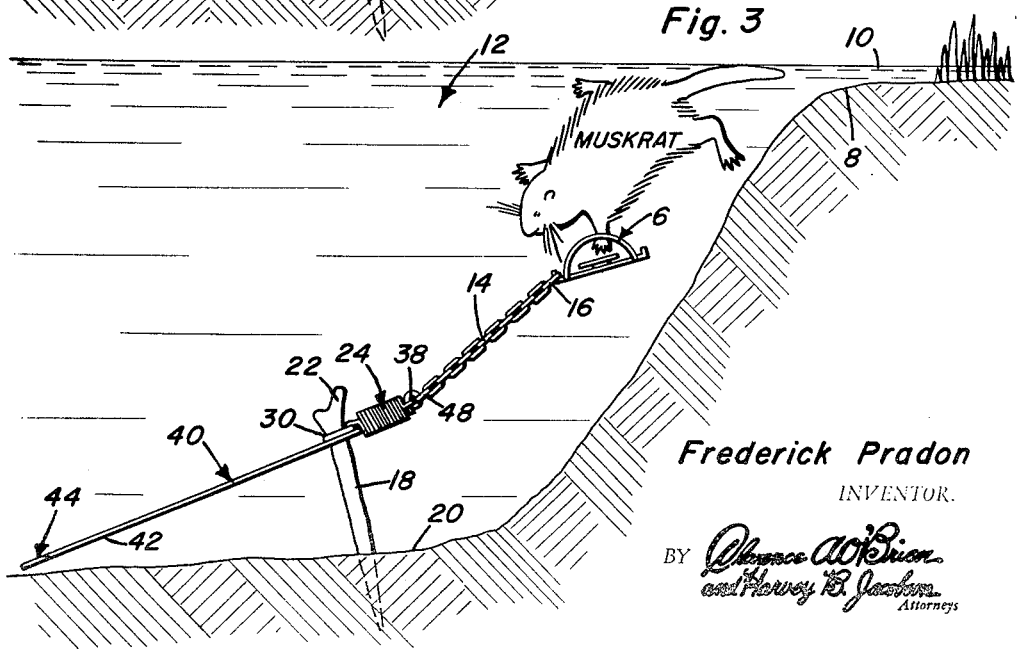
Frederick Pradon
INVENTOR.
BY *Clarence A. O'Brien*
*and Harvey B. Jackson*
Attorneys

United States Patent Office 3,178,849
Patented Apr. 20, 1965

3,178,849
ANIMAL TRAPPING AND DROWNING DEVICE
Frederick Pradon, 11933 River Road, Calverton, N.Y.
Filed Aug. 23, 1963, Ser. No. 304,180
3 Claims. (Cl. 43—96)

This invention relates to a conventional-type jaw trap equipped with the usual anchoring chain and an improved spring-loaded animal drowning attachment connected with the chain and which effectually solves the problem of not only trapping the animal but reliably holding it after it has been successfully trapped.

As the experienced trapper well knows, the conventional steel jaw trap used to capture animals is provided with an anchoring chain which, even when staked in deep water (pond, lake or stream) often fails to drown the animal, a muskrat for example. The fact is, the trapped muskrat can and does get loose and escapes. Despite the fact that the free end of the chain has been staked in deep water, the trap has to be set near or on the shore in shallow water. Under the circumstances, the victim seeks and resides in shallow water during the struggle for survival. The leg bone is often snapped during the struggle and escape follows. If a muskrat is not drowned quickly escape is inevitable. Experience has shown that countless victims free themselves as a result of a broken leg known by trappers as "twist off" or "wring off" some escapees survive, others die an agonizing death. The broad objective in the instant matter is to cope with the problem in a significantly humane manner and to solve it in a feasible, satisfactory and profitable manner.

In addition to the quick drowning the present invention is also advantageous for other reasons. For example, it preserves "set location." Once the device is activated by the trapped animal, the victim cannot reach the trap bed which would ordinarily be torn up and destroyed in the struggle, thereby ruining it for successive catches. Also, if bait is used to make a catch, the activated device will preserve the bait safe for further use. Another feature is that a partially or completely submerged "rat" held down by a unique spring device, reduces the possibility of the catch, trap or both being stolen.

As will be hereinafter more fully appreciated the present invention is simple, complete, ready to use, requires no adjustments or additional fastenings other than a stake. It does not in any way hinder or retard the functioning of the trap, because the operation of the trap itself, does not activate or release the device. The animal's struggle causes the device to function. The manufacture of a special spring or other part of a trap is not necessary. It will work on any type steel trap such as the long spring, coil spring or underspring traps. A trapper can use the device on any trap which he owns.

Construed as a combination this invention, briefly stated, comprises a trap designed and constructed to catch and hold a fur bearing animal, extensible and retractible means having one end connected with said trap, said means being extended when the trap is set and automatically retracted after the trap makes its catch, a stake, means carried by and connecting the other end of said extensible and retractible means to said stake, and animal actuated means cooperable with said extensible and retractible means and stake respectively, normally engaging said stake but being disengaged and released from the stake and causing the extensible and retractible means to retract as a result of the action of the animal struggling to free itself from said trap.

The herein disclosed invention also serves as an animal drowning attachment for a trap. To this end it has to do with an elongated rigid rod having means at one end for linked connection with the aforementioned anchoring chain, the other end of said rod having a triangular head providing trippable abutment which is adapted to reside when in use in end thrust but releasable engagement against a relatively stationary stake. A coil spring encircles an end portion of said rod, said spring being normally contracted and having one end secured to the corresponding one end of said rod, the other end of said spring being free of connection with said rod and having a ring secured thereto, said ring being adapted to encircle said stake.

Other objects, features and advantages of the invention will become more readily apparent from the following description and the accompanying drawing.

In the views of the accompanying drawing like numerals will be employed to designate like parts throughout the views:

FIG. 1 is a view in perspective of a steel jaw trap drowning device or attachment constructed in accordance with the present invention.

FIG. 2 is a view showing the trap set in shallow water, showing the anchoring stake driven in the bed of deep water and illustrating the drowning device or attachment and the manner in which it is connected with the stake and chain, respectively, and is consequently set to make the catch.

FIG. 3 is a view similar to FIG. 2 and which shows the trap, victim and chain forcibly pulled by the action of the drowning device, the latter having been activated and released in a manner to achieve the result desired.

Referring first to FIG. 2 the animal trap, which is a conventional steel jaw trap is denoted by the numeral 6. It is shown in its set position on the shore area, as at 8 in the shallow water denoted at 10. The deep water is designated at 12. As is usual the trap 6 is provided with an anchoring or staking chain 14, one end of which is swivelly connected (not detailed) to the trap structure as at 16.

The drowning device or attachment is shown in its normal state in FIG. 1 wherein it will be noted that it comprises novel projectable and retractible means one end of which is connectable with the chain 14 and the other end of which is connectable but in an unusual and unique manner to a wooden or an equivalent stake 18 driven into the water bed 20. The stake ordinarily used has an enlarged headed or forked upper end 22 which insures proper functioning of the invention. In actual practice an appropriately constructed metal or an equivalent stake (not shown) can, of course, be used in lieu of the stake 18. Other aspects of this phase of the concept will be hereinafter revealed. Also, as shown in FIG. 1, the attachment, more specifically, comprises a coil spring 24 of requisite length and strength. The endmost coil 26 at the left is connected at 28 with a stake embracing holddown ring or an equivalent member 30. The main coils of the spring are denoted at 32. The endmost coil 34 at the right (FIG. 1) is connected as at 36 with an eye or an equivalent member 38 at the upper or right hand end of a rigid elongated spring tensioning, cocking and spring releasing rod 40. The lower end portion 42 of this rod is provided with an end thrust and releasing head 44 which, more specifically comprises a triangularly bent portion, one component 46 of which constitutes an abutment and when in use has end thrust abutting relation with the stake 18 as illustrated in FIG. 2. An S-shaped link 48 is also connected at one end with the aforementioned eye 38. The openable end 50 of this link is connectible with a selected link 52 of the aforementioned chain 14.

It will be evident that in order to bring the trap 6, chain 14 and drowning device (FIG. 1) into play the user inserts the stake 18 (equivalent peg) through the terminal ring 30. He then stakes the ring in deep water opposite the trap bed or set location. Next, he pulls on the trap until the head 44, particularly the abutment 46, abuts and bears on the stake under the ring as illustrated in FIG. 2. This procedure will place the trap in the shallow water 6. The trap is now set in the usual manner. It will be evident that the desired length of chain plus its swivel connection on the trap allows the set to be to either side, above or straight in line with the trip rod 40 without disturbing the rod which is now "locked" to the stake by the now tensioned spring 24.

Assuming that the muskrat or other victim has stepped into the trap the struggle to escape is promptly undertaken. The motion of the trap 6, chain 14 and drowning device will result in the headed end 44 disengaging itself from the stake. This allows the spring 24 to come into play and to thus forcibly pull and hold the trapped animal in deep water. Experience has shown that thus trapped (see FIG. 3) the animal drowns quickly thereby preventing either "twist off" or escape.

Although, the invention is primarily to be used in water trapping, it can also be employed advantageously for dry land trapping. For instance when trapping skunks at their dens the trap must be placed within the entrance to insure that the animal will step into it. Setting out side the entrance will allow the skunk to avoid the trap. A trap equipped with a conventional chain will allow a trapped skunk to seek shelter in the mouth of the den, especially at the approach of the trapper. The skunk under these conditions would be difficult to shoot, and pulling on the chain will certainly result in the trapper being scented. However, if the trap is equipped with the disclosed invention, the struggling skunk will activate it, whereby, the spring would hold him out and away from the den, making dispatching of him quite simple. This practice can also be used at sets involving baited hollow logs, rock crevices and so on.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An animal drowning attachment for a jaw trap having an attached stake-down chain comprising: an elongated rigid rod having means at one end for linked connection with a cooperating end of said chain, the other end of said rod having a triangular head providing a trippable abutment adapted to reside when in trippable use in end thrust engagement against a relatively stationary stake, and a coil spring encircling said one end portion of said rod, said spring being normally contracted and having one end secured to the corresponding one end of said rod, the other end of said spring being free of connection with said rod and having a ring secured thereto, said ring being adapted to encircle said stake.

2. The structure according to claim 1, and wherein said one end of said rod is provided with an eye, a link swingably connected to said eye and connectible to said cooperating end of said chain, said one end of said spring being connected to said eye.

3. An animal drowning attachment for a conventional-type jaw trap provided with a trap staking and anchoring chain and wherein said chain has an inward end swivelly connected to and constituting a part of said trap comprising: and elongated spring tensioning, holding and cocking rod having one end adapted to be connected to the outer end of said chain, the other end of said rod being free and terminating in a rigid abutment adapted to have end thrust releasable engagement with a relatively fixed spring anchoring stake, a coil spring encircling said rod and having an inward end connected with said one end of said rod, the outer end of said spring having a free ring which is adapted to encircle and attach said spring to said stake and to yieldingly retain said abutment in end thrust engagement with the aforementioned anchoring stake.

References Cited by the Examiner
UNITED STATES PATENTS

| | | | |
|---|---|---|---|
| 2,233,380 | 2/41 | Clayton | 43—96 |
| 2,252,405 | 8/41 | Navin | 43—96 |

ABRAHAM G. STONE, *Primary Examiner.*